United States Patent [19]
Poetsch et al.

[11] 3,875,583
[45] Apr. 1, 1975

[54] CIRCUIT FOR MODIFYING COLOR CHARACTERISTICS

[75] Inventors: Dieter Poetsch, Am Pfarrweiher; Horst Peth, Alsbach, both of Germany

[73] Assignee: Robert Bosch Fernsehanlagen GmbH, Darmstadt, Germany

[22] Filed: July 31, 1973

[21] Appl. No.: 384,260

[30] Foreign Application Priority Data
Aug. 1, 1972 Germany ............ 2237784

[52] U.S. Cl. ............ 358/27
[51] Int. Cl. ............ H04n 9/535
[58] Field of Search ............ 358/27, 28, 29

[56] References Cited
UNITED STATES PATENTS
3,604,841 9/1971 Ettlinger ............ 358/27
3,737,561 6/1973 Boer ............ 358/27

*Primary Examiner*—Richard Murray
*Attorney, Agent, or Firm*—Littlepage, Quaintance, Murphy & Dobyns

[57] ABSTRACT

A circuit for modifying the color characteristics of a video signal by deriving a luminance signal which may have certain characteristics stressed, deriving color control signals according to the color system being used, multiplying the luminance signal by the control signals to derive two luminance control signals, and using the luminance control signals to modulate two respective quadrature-related carrier signals to derive a corrected video signal.

11 Claims, 2 Drawing Figures

CIRCUIT FOR MODIFYING COLOR CHARACTERISTICS

BACKGROUND OF THE INVENTION

The invention relates to a circuit for modifying the color characteristics of a picture produced by a color picture signal, in which circuit a quadrature-modulated voltage of chrominance carrier frequency and with a selectable amplitude and phase is added as additional voltage to the likewise quadrature-modulated chrominance carrier of an FBAS color video signal.

In many cases it is desirable to modify the color type, especially the chroma, of the picture reproduced, according to subjective feeling. This task exists especially at the studio control desk, and the means for modifying the chroma in this case act upon all receivers. When, for example, a signal is received from a remote studio which has an undesirably strong red tint because of some illumination, or because of scanning a color film of unsatisfactory color, it is desirable to diminish the red component of the color picture. Also, for instance, a controller may wish to impart to the picture a specific color tint, for example, green. The modification of the color type, for example, the accentuation or attenuation of a specific color may also be desirable for control reasons for the achievement of some particular effect.

The theoretically exact solution of the problem would first call for the production of the three color value signals by demodulation and subsequent remodulation, in which process the RGB signals produced in the demodulation may be affected in such a way as to be corrected.

Since this demodulation-remodulation circuit involves considerable expenditure, two other methods for electronically correcting color type errors have become known. One involves correction in the R, G and B, signals, and the other, correction in the FBAS signal.

A correction in the R, G and B signals is described in the periodical, *Journal of the SMPTE*, Vol, 74 (1965), pages 755–759. Such R, G and B correctors, however, can only be inserted in the relatively short signal path between film scanner and coder.

A method for correcting FBAS signals is known from the periodical *Rundfunktechnische Mitteilungen*, Vol. 13 (1969), No. 4, pages 141–147. Here a coupled chrominance carrier is first produced, by means of a regenerator, from the burst of the FBAS signal to be corrected, which chrominance carrier is fed by way of a 0° to 360° phase shifter to a modifier. In this modifier, a phase reflected on the B–Y axis is produced which is shifted in PAL rhythm. The chrominance carrier thus produced is then modulated with a luminance signal derived from the FBAS signal to be corrected, and is added, by way of an adding stage, to the FBAS signal to be corrected.

The construction of such known correctors for FBAS signals, however, is very expensive and technically difficult, especially the construction of 0° to 360° phase shifters which must be insensitive to temperature changes, as well as modifiers which likewise must be insensitive to temperature changes, in order to produce a phase exactly reflected about the B–Y axis of the supplied chrominance carrier. Furthermore, the operators of these known FBAS color correctors undergo considerable demands regarding the choice of the correct additional voltage, since the operators are generally not used to assigning specific angles to the corresponding colors.

SUMMARY OF THE INVENTION

The present invention relates to a circuit for modifying the color type in which the aforementioned disadvantages of known FBAS color correction circuits are avoided.

The problem is solved, according to a preferred embodiment of the invention, by feeding a luminance signal produced from the FBAS color video signal as a first factor to a first and a second multiplying circuit; feeding three adjustable d. c. voltages which represent R, G and B components to a matrix for forming two d. c. voltages representing color difference signals; feeding the first d. c. voltage formed in the matrix and representing a color difference signal as a second factor to the first multiplying circuit: feeding the second d. c. voltage representing a color difference signal as a second factor to the second multiplying circuit; and finally, connecting the outputs of the first and second multiplying circuits representing luminance control signal, to the two inputs of a quadrature-modulated modulation stage from the output of which the quadrature-modulated addition voltage of chrominance carrier frequency can be tapped.

One advantage of the invention is that the 0° to 360° phase shifters and modifiers are lacking. Color type correctors as in the invention can therefore be constructed more simply and more economically. Besides the circuit of the invention facilitates the operation. By the return to a quasi-RGB plane, color type corrections can now be carried out in a manner whose simplicity resembles that of carrying out RGB corrections. A further advantage results from the use of time-tested modulation stages, in which connection it should be pointed out that only a low-frequency video signal as a modulating signal and a fixed chrominance carrier signal as a carrier are fed to these modulation stages.

A further development of the invention is that the luminance signal produced from the FBAS color video signal, distorted in amplitude dependence, is fed by way of a circuit known per se to the first and second multiplying circuits and that several independent circuits are, for adjusting the color type, connected in parallel via adding stages, in which structure each independent circuit for adjusting the color type consists of a matrix, and a first and a second multiplying circuit, and is in each case controlled by a luminance signal which is differently distorted in amplitude dependence.

A further development of the invention is that the three d. c. voltages representing the R, G and B components are separately adjustable by means of three potentiometers. In another embodiment the three potentiometers are coupled by a mechanical device and adjustable by means of a single control stick. In another embodiment the three potentiometers may be coupled with a shaft, in which structure the 360° of the slideway of each potentiometer consists alternately of 120° contact material and 60° resistance material, and the slideways or the slides of three potentiometers are mutually displaced by 120°.

BRIEF DESCRIPTION OF THE DRAWINGS

In the figures, circuits with the same effect are indicated by the same reference numerals.

DESCRIPTION OF THE PREFERRED EMBODIMENTS

Figure 1:
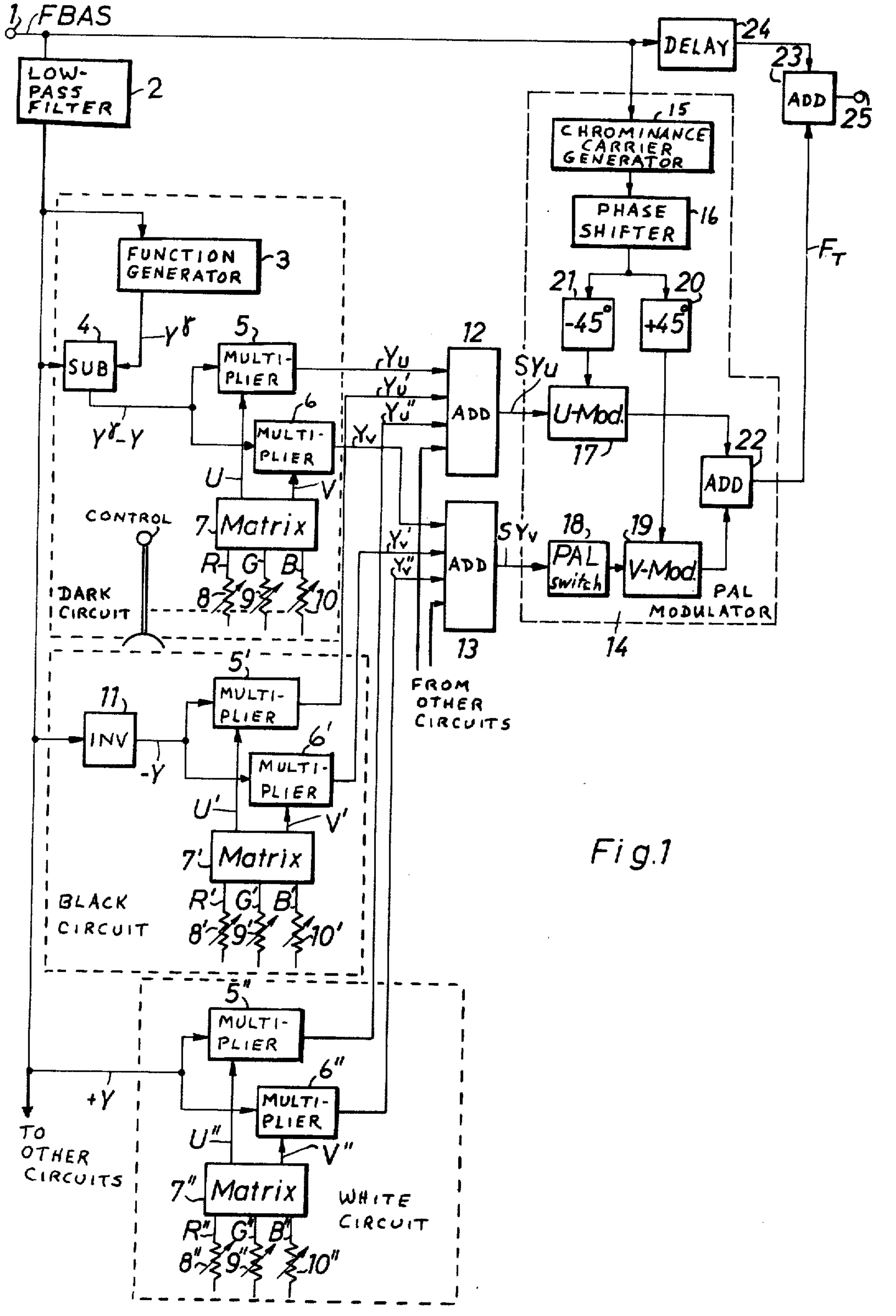
FIG. 1 is a block diagram of an FBAS color corrector for PAL color video signals.

In the block diagram of FIG. 1, an FBAS color video signal is fed, by way of a terminal 1, to a low-pass filter 2. By means of this low-pass filter 2, the brightness information (luminance signal Y) is produced from the FBAS color video signal. The down 3 dB point of this low-pass filter 2 is located near 1.3 MHz. The luminance signal Y thus obtained is then fed to a "dark," "black," and "white" corrective circuit, in which structure each corrective circuit separately represents an independent circuit for adjusting the color type. In the "dark" connection circuit, the luminance signal Y is fed, by way of a function generator device 3 with a nonlinear characteristic to a subtracting stage 4. The non-distorted luminance signal Y is subtracted in the subtracting stage 4 from the luminance signal $Y^{\gamma}$ , distorted in gradation in device 3 and fed in each case to the inputs of a first and second multiplying circuit, respectively 5 and 6. Another input to the multiplying circuit 5 is controlled by a d. c. voltage representing a correction signal U, and another input to the multiplying circuit 6 is controlled by a d. c. voltage representing a correction signal V. These d. c. voltages similar to color difference signals U and V are produced in a matrix 7. Three adjustable d. c. voltages are fed as R, G and B components to this matrix 7 by way of potentiometers 8, 9, and 10. Thus the control matrix 7 produces, in the same way as the matrix of a PAL coder, the corresponding adjusting voltages for the U and V axis, in which process furthermore the d. c. voltages representing the connection signals U and V adjust the luminance signal $Y^{\gamma}$ −Y.

Although, in the "dark" correction circuit, only the middle levels of an FBAS signal to be corrected can be modified, a further independent circuit for adjusting the color type affects mainly the "black" color components of the FBAS color video signal to be corrected. For this purpose the luminance signal Y is fed to an inverter stage 11. From this inverter stage 11, the luminance signal Y, inverted in polarity, reaches the multiplying devices 5′ to 10′ for multiplying the d. c. voltages representing the correction signals U′ and V′. If, for example, the color tints in the lights of color films are to be removed, the "white" correction is used. The "white" correction with the device 5″ to 10″ for adjusting the color type is controlled directly by adjusting the luminance signal.

The circuit of the invention is not limited to these three mentioned devices for adjusting the color type. Other more differentiated modifications of the color type dependent on the luminance signal are likewise conceivable and indicated by lines to and from possible other circuits.

The thus produced individual signals, Yu, Yu′, Yu″, Yv, Yv′, and yv″ at the outputs of the multiplying circuits are fed in each case by way of an associated adding stage 12 and 13 to the corresponding modulation inputs of a PAL modulator 14. A chrominance carrier generator 15 provided in the PAL modulator is synchronized with the burst of the FBAS signal to be corrected. By means of a phase shifter 16, the phase between the FBAS color video signal to be corrected and the chrominance carrier produced in the chrominance carrier generator 15 is adjusted. The signal SYu from the output of adding stage 12 passes through a U modulator 17, while the signal SYv from the output of adding stage 13, after video-frequency PAL shifting by means of PAL switches 18, modulates a chrominance carrier turned by 90° in the V modulator 19. The chrominance carrier turned by 90° is fed by way of phase shifters 20 and 21 which are turned by ± 45°. The outputs of U and V modulators 17 and 19 are connected to the inputs of an adding stage 22. The required additional voltage $F_T$ prevails at the output of this adding stage 22. In a further adding stage 23, this additional voltage $F_T$ is added to the FBAS color video signal delayed in a delay line 24. The delay line 24 serves for delay adjustment between the FBAS color video signal and the additional voltage $F_T$. The corrected FBAS color video signal can be tapped at a terminal 25.

Figure 2:
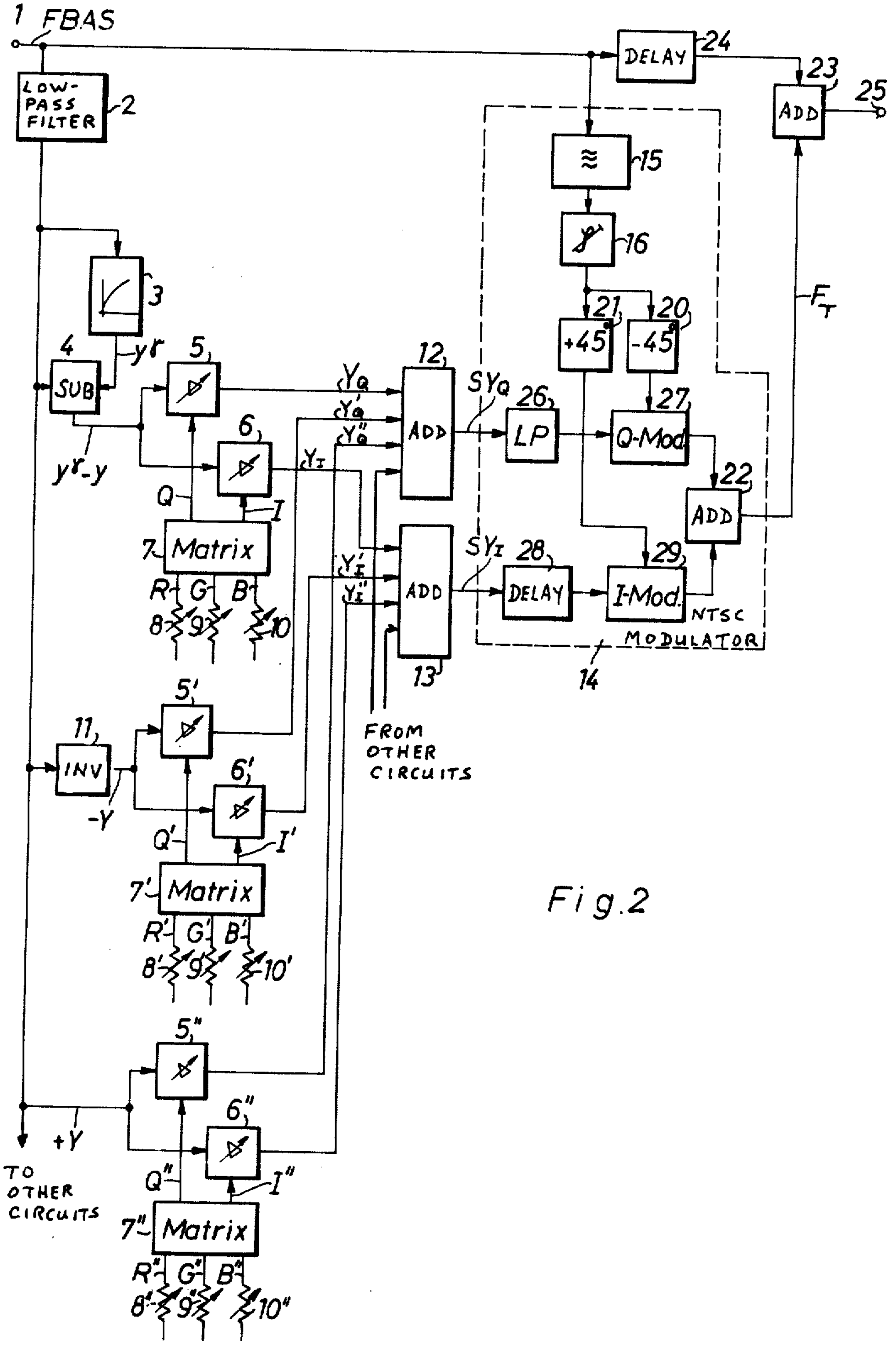
FIG. 2 is a block diagram of an FBAS color corrector for NTSC color video signals.

FIG. 2 shows a block diagram according to the invention for NTSC color television video signals. This block diagram differs from the one described above only in that the matrices 7, 7′, 7″ form now d. c. voltages similar to color difference signals I and Q, and furthermore, that the signal $Y_Q$ is fed, at the output of adding stage 12, by way of a low-pass filter 26, to a Q modulator 27. Furthermore, in the NTSC color television system PAL switch 18 is lacking. PAL switch 18 is replaced by a delay line 28 which merely balances the delay of low-pass filter 26. The signal $Y_I$ at the output of adding stage 13 is therefore fed directly to the I modulator 29 by way of delay line 28. Furthermore, the frequency of chrominance carrier generator 15 is correspondingly adapted to the NTSC chrominance carrier frequency.

What is claimed:

1. A circuit for modifying color characteristics of a picture produced from a color video signal by modifying the color video signal, comprising:

A. means for deriving a luminance signal from the color video signal,

B. matrix means responsive to three adjustable d.c. signals representing three color components for forming first and second correction signals, C. first and second multiplier means both responsive as one input to the luminance signal and respectively responsive as a second input to first and second color difference signals for respectively generating first and second product signals, D. means for modulating two quadrature components of a chrominance carrier signal derived from the color video signal respectively with the first and second product signals to derive first and second chrominance carrier components, and E. means for additively combining the first and second chrominance carrier components and the color video signal to derive a modified color video signal.

2. A circuit according to claim 1, further comprising means responsive to the luminance signal produced from the color video signal for feeding a version of the luminance signal, distorted in dependence upon its amplitude, to the first and second multiplier means.

3. A circuit according to claim 1 comprising

A. several independent circuits for adjusting the color characteristics for providing parallel outputs, B. an adding stage responsive to the parallel outputs for providing the first and second product signals, and C. wherein the first and second multiplier means receives, in each case, a luminance signal which is distorted in different ways in dependence on the amplitude.

4. A circuit according to claim 1, further comprising the three potentiometer means for separately adjusting the three d.c. signals representing three color components.

5. A circuit according to claim 4 further comprising a mechanical device for coupling the three potentiometers, whereby they are adjustable with a single control stick.

6. A circuit according to claim 1 for use with an NTSC color television system wherein the matrix is constructed such that, from the three d.c. voltages representing three color components R, G and B, the d.c. voltages similar to the color difference signals have values such that they represent standard NTSC signals I and Q.

7. A circuit according to claim 1 for use with a PAL color television system wherein the matrix is constructed such that, from the three d.c. voltages representing three color components R, G and B, the d.c. voltages similar to the color difference signals have values such that they represent standard PAL signals U and V.

8. A circuit according to claim 1 further comprising means for deriving the chrominance carrier signal which is used to provide the two quadrature components in synchronization with bursts of the color video signal to be corrected as to the color characteristics.

9. A circuit according to claim 8, further comprising phase shifter means for adjusting the phase of the chrominance carrier used for deriving the two quadrature components.

10. A circuit according to claim 1, wherein, for the purpose of modifying the color characteristics of an FBAS color video signal produced according to the NTSC color television system, an additional voltage ($F_T$), which is quadrature-modulated, likewise according to the NTSC color television system, is provided by means of the modulating means.

11. A circuit according to claim 1, wherein, for modifying the color characteristics of an FBAS color video signal produced according to the PAL color television system, an additional voltage ($F_T$), which is quadrature-modulated, likewise according to the PAL color television system, is provided by means of the modulating means.

* * * * *